US005438899A

United States Patent [19]

Hoyer-Ellefsen

[11] Patent Number: 5,438,899

[45] Date of Patent: * Aug. 8, 1995

[54] MATERIAL-WORKING TOOL CONTROL SYSTEM

[76] Inventor: Sigurd Hoyer-Ellefsen, 540 Kay Ter., Boca Raton, Fla. 33432

[ * ] Notice: The portion of the term of this patent subsequent to Nov. 30, 2010 has been disclaimed.

[21] Appl. No.: 156,375

[22] Filed: Nov. 22, 1993

Related U.S. Application Data

[63] Continuation-in-part of Ser. No. 819,218, Jan. 13, 1992, Pat. No. 5,265,510.

[51] Int. Cl.⁶ .................. B23D 45/04

[52] U.S. Cl. .................. 83/471.3; 83/468.3; 83/486.1; 83/477

[58] Field of Search .................. 83/477.1, 472, 473, 83/485, 477.2, 491, 468.2, 468.3, 486.1, 588, 477, 490, 471.3, 468.1

[56] References Cited

U.S. PATENT DOCUMENTS 2,007,563 7/1935 De Koning .................. 83/486.1
2,320,743 6/1943 Nilsen .................. 83/486.1
2,353,088 7/1944 Schutz .................. 83/485
3,026,917 3/1962 Schwartz .................. 83/490
3,998,121 12/1976 Bennett .................. 83/471.3
4,660,448 4/1987 Bies .................. 83/478

OTHER PUBLICATIONS

Speed Cut, Inc. publication, Spida "Radial Saws", Apr., 1990.

*Primary Examiner*—Eugenia Jones
*Assistant Examiner*—Allan M. Schrock
*Attorney, Agent, or Firm*—Quarles & Brady

[57] ABSTRACT

A material-working tool control system includes a tool support and a guide linkage for controlling the position and motion of a tool or tool mounting platform. The tool mount extends substantially horizontally and parallel to an underlying work surface and permits motion of the tool platform to and from a vertical axis of rotation to which the mount is connected. Similarly, the guide linkage extends from the tool mount to another vertical axis of rotation in a substantially vertical plane, transverse to the underlying work surface. The tool support bears substantially all the vertical loads of the system, thereby relieving the guide linkage of this weight-bearing function.

21 Claims, 9 Drawing Sheets

MATERIAL-WORKING TOOL CONTROL SYSTEM

CROSS-REFERENCE TO RELATED APPLICATION

This is a continuation-in-part of U.S. patent application Ser. No. 07/819,218, filed Jan. 13, 1992, now U.S. Pat. No. 5,265,510.

FIELD OF THE INVENTION

The invention relates to tool control systems. More particularly, the invention relates to systems for supporting and guiding tools, such as table saws, relative to an underlying work surface.

BACKGROUND OF THE INVENTION

The adjustability of saws and other electric machine tools relative to a work surface, such as that of a workbench, has been a longstanding concern in the prior art. In applications such as the construction of roof trusses, in which numerous members having a variety of differently angled cuts must be generated in large numbers, factors such as the mobility, portability, ease of adjustability and repositioning of the tool, and weight of the system, are all important.

While numerical control machines have become commonplace in the control of many machine tools, for example, machine drills, lathes, files, and etching devices, a suitable numerical (or computer) control machine suitable for use with a power saw at a construction site, in which the cutting of many wood members having various angles is often required, has not appeared in any practical or economic form.

Efforts made along these lines that are known to the inventor include a programmable turntable manufactured by Speed Cut, Inc., of Corvallis, Oreg. 97339, and the so-called SPIDA Radial Saw, also manufactured by Speed Cut. Comparable products are offered by a handful of other companies around the world.

Systems such as those of Speed Cut, Inc. involve considerable weight, occupy a large volume and ground area, are heavy, costly, are not easy to adjust or program, and are time-consuming to maintain. Also, they are not as easy or convenient to work with in the field as might be desired.

At a more technical level, systems such as those of Speed Cut make use of articulated arms which extend directly from a rotatable junction with a workbench associated with the cutting system. The shortcoming of this structure is that vertical loads upon the arms are transmitted to a rotatable support joint. Therefore, a particularly robust structure is required with the relatively high costs attendant thereto. Also, achievement of proper registration between the cutting tool and the workpiece is complex where the workpiece is secured to a rotating joint with the workbench. That is, loads on vertical bearings are not evenly distributed, thus degrading accuracy of the saw blade. Understandably, systems of the above type also impart considerable wear on their moving parts. It is, therefore, as a response to the above set forth long felt need in the prior art that the invention is directed.

SUMMARY OF THE INVENTION

The invention relates to a control system for material-working tools, such as saws, which are preferably used in connection with an underlying work surface, such as the planar work surface of a workbench. Generally, the invention includes structure for supporting and guiding the tool relative to the underlying work surface.

The system can include a tool mount, or directly, a tool, that is supported by a tool support and maintained in a cut path by a separate guide linkage. The guide linkage interconnects the tool mount to a first support joint that provides a first vertical axis of rotation about which the guide linkage and the tool mount pivot. Similarly, the tool support interconnects the tool mount with a second support joint which provides a second vertical axis of rotation about which the tool mount and the tool support pivot. The first and second support joints can be connected to the work surface directly or can be mounted to a support frame secured to a wall or other structure adjacent the work surface.

The tool support provides means for maintaining the tool mount in a horizontal plane of motion above the work surface toward and away from the two respective axes of rotation. In a preferred embodiment, the means includes two or more arms hinged to pivot relative to each other. The guide linkage can similarly include pivoting arms extending in a substantially vertical plane between the first support joint and the tool mount. One arm is pivotally connected to the tool mount to pivot vertically about a horizontal axis. Correspondingly, the tool support can include two or more pivoting arms that extend substantially horizontally between a pivotal connection with the tool mount and a pivotal connection with the second support joint.

The guide linkage primarily permits positioning of the tool for accurate cuts and prohibits side-to-side rotation of the blade edge of the tool that might otherwise occur due to vibrations. To maintain a continuous passage of the tool through an opening in a workpiece guidance fence on the work surface, the first axis of rotation, to which the guide linkage is connected, preferably coincides with this passage. Also, the guide linkage must connect to this axis of rotation in a manner that does not interfere with the travel of the tool. Accordingly, the guide linkage can be connected to the first support joint by non-interfering connector structure, such as a platform beneath the work surface or suspended above the work surface and the travel plane of the tool support.

According to the invention, the vertical loads that would otherwise be leveraged on the first support joint and the associated bending moment caused by the cantilever arrangement of the connector structure are substantially avoided by bearing substantially all the vertical loads through the tool support. The tool support extends substantially horizontally to a second support joint that is preferably mounted directed to the work surface or a support frame mounted to an adjacent wall.

Thus, the vertical loads are carried by the tool support structure and the guide linkage is relieved of the disadvantages associated with bearing the vertical loads and their bending moments. The connector structure for the guide linkage can be reduced in size and weight because of its non-weight bearing function. Tool positioning is therefore easier. The support joint is not subjected to wear typically attributable to combined load bearing and rotational adjustment. Further, maintaining a substantially horizontal plane of travel for the tool, parallel to the underlying surface, is easier and more reliable.

BRIEF DESCRIPTION OF THE DRAWINGS

A more thorough understanding of the invention can be gained from a reading of the following detail description of embodiments in conjunction with the associated drawings, in which.

DETAILED DESCRIPTION OF EMBODIMENTS OF THE INVENTION

The invention is directed to a system for supporting and guiding a material-working tool relative to an underlying work surface. The work surface is not a necessary element of the invention, but it is intended generally that the system of the invention be used in connection with a work surface for supporting and possibly aligning a work piece, such as a piece of wood, to be cut or otherwise altered.

Figure 1:
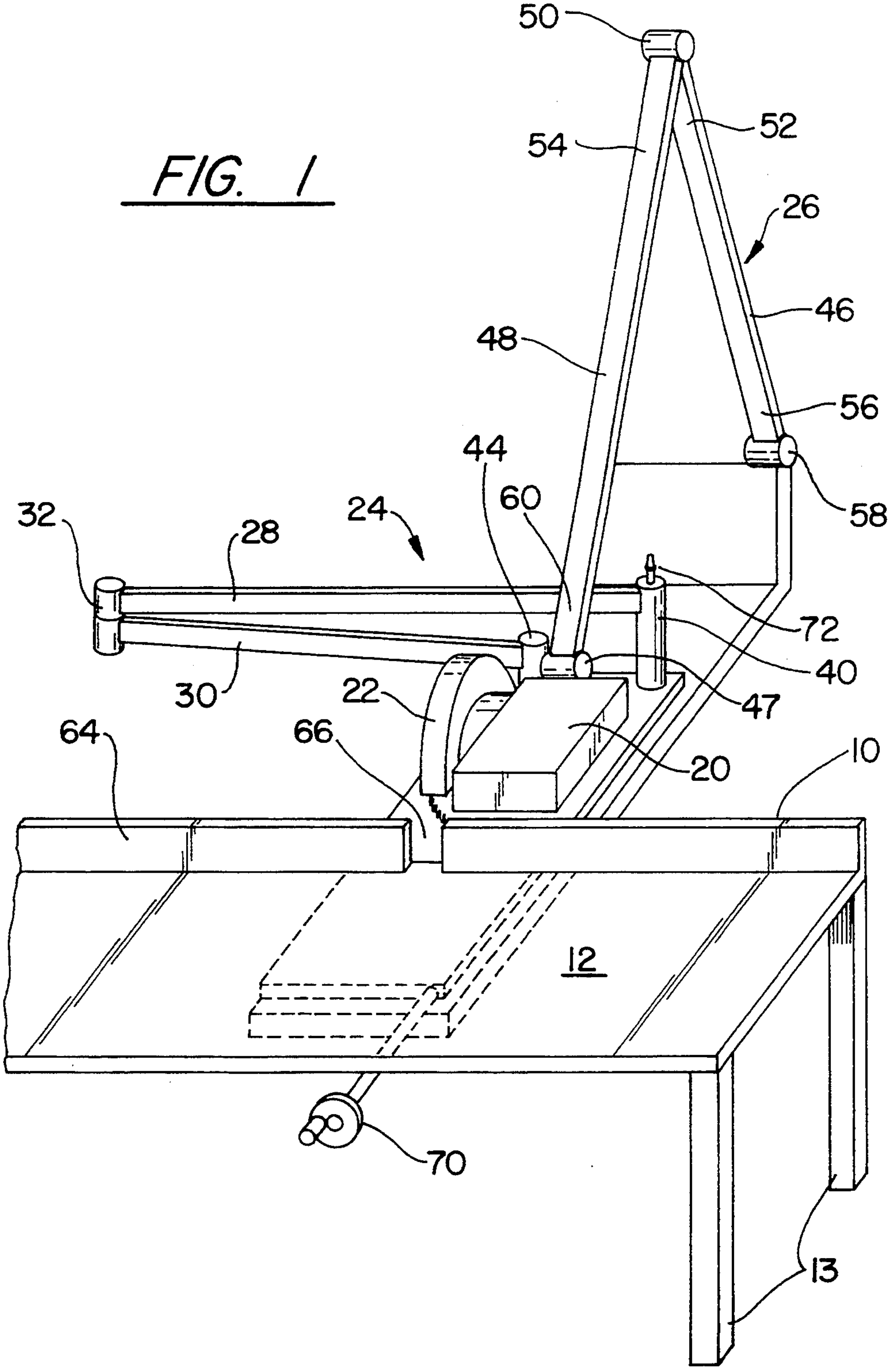
FIG. 1 is a perspective view of an embodiment of the invention.
Figure 2:
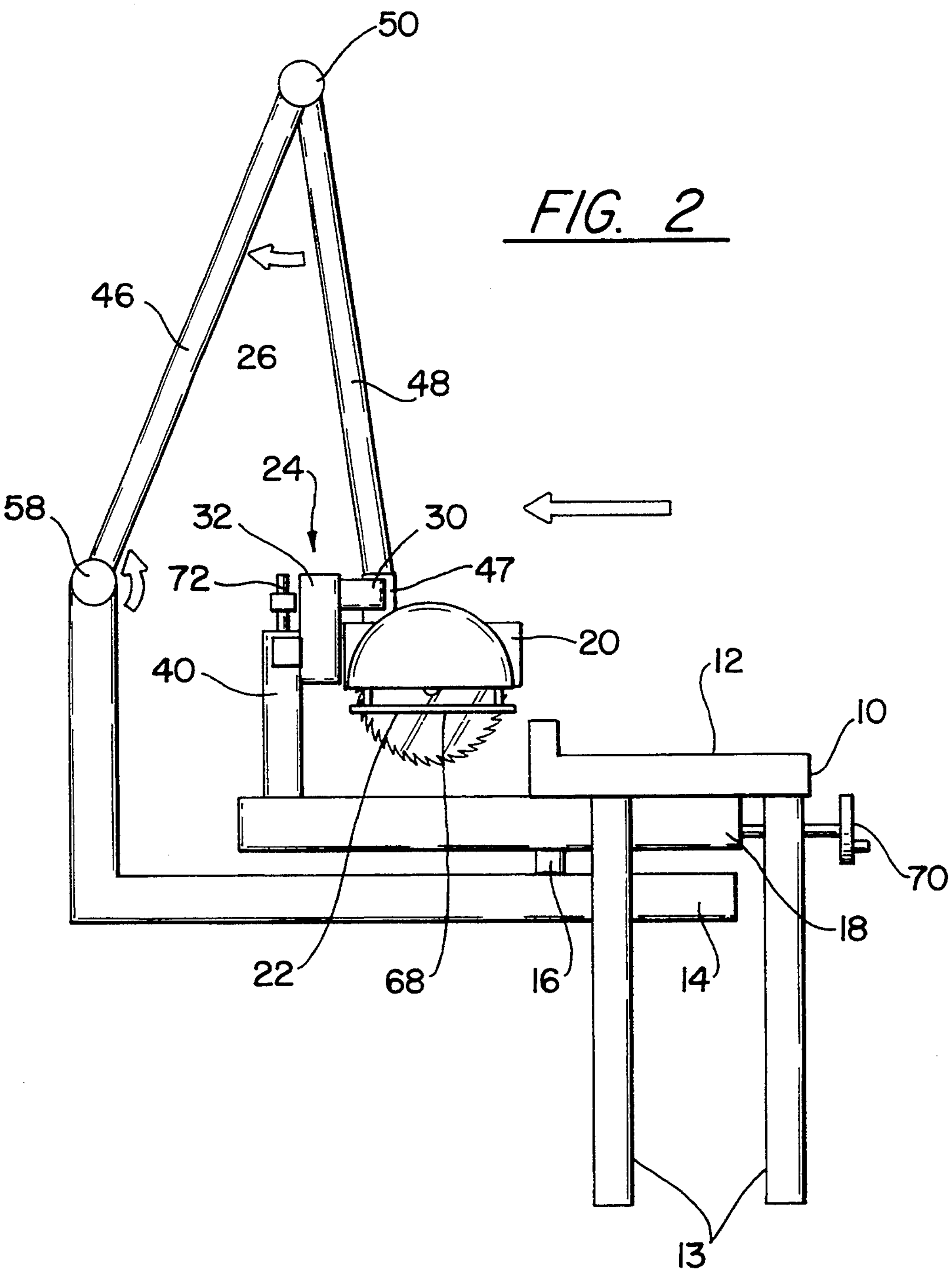
FIG. 2 is a side left elevational view thereof.

With reference to the perspective views of FIGS. 1 and 2, there is shown a workbench 10 including a work surface 12. The workbench 10 represents a generic workbench which, in a given application, will include such elements as clamps, stops, miter boxes and other angle control means, the use of which may or may not be required, depending upon a given application of the instant systems. The workbench 10 can elevate the work surface 12 by legs 13. The system of the invention also has application with other material working environments in which the work surface is not provided by a workbench, for example, a work surface established by the plane between two sawhorses supporting a sheet of plywood.

Generally, the invention includes a tool support and a separate guide linkage, each interconnecting a tool mount to support joints about which the tool mount pivots and translates, preferably in a horizontal plane of travel. The system can also include a tool directly connected to a tool support and guide linkage; however, a tool mount presents an opportunity for interchangeability of tools.

Each support joint provides a substantially vertical axis of rotation. The guide linkage provides means for permitting movement of the tool or tool mount to and from a first support joint. The tool support provides means for permitting movement of the tool or tool mount to and from the second support joint.

The guide linkage is connected to the tool mount to pivot about a horizontal axis and preferably extends to the first joint support in a substantially vertical plane. The tool support pivotally connects to the tool mount about a vertical axis and preferably extends in a substantially horizontal plane. Together, the guide linkage and the tool support maintain the tool mount in a substantially horizontal plane of travel along radial lines extending from the first support joint.

Referring to the figures and particularly to FIGS. 1 and 2, at a level beneath the work surface 12 of the workbench 10, connector structure, such as a platform 14, is in rotatable communication with the workbench 10 through a first support joint 16 which defines a first axis of rotation that is normal to both the workbench surface 12 and to a base platform 18 which is in rigid communication with the workbench 10. It is noted that the base platform 18 is an optional element which will be generally useful where the inventive system is used to retrofit a preexisting workbench.

Also, the first axis of rotation established by the first support joint 16 may or may not pass through the base platform 18 in embodiments in which the platform 18 is employed. However, in all embodiments, this first axis of rotation must be in orthogonal (normal) relationship to the workbench 10 and its work surface 12 to prevent, for example, non-horizontal descent of the tool into the work surface 12.

The base platform 18, where employed, may be positioned either above or below the workbench 10. Similarly, in a given embodiment, the rotatable platform 14 may also be positioned slightly below workbench surface 12 or, in other embodiments, may be positioned above the other mechanical elements, as in an embodiment described below.

With reference to FIGS. 1-4, the instant inventive system can further include a tool mount or platform 20 to which may be attached either an electric circular saw 22, as shown in the figures, or any of a variety of other tools, such as tools for engraving, milling, grinding, polishing and painting. Further provided, as elements of the invention, are a tool support 24 and a guide linkage 26.

The tool support 24 can include a first arm 28 and a second arm 30, which are connected in rotational relationship by a hinge 32 such that the first arm 28 and the second arm 30 may rotate relative to each other. However, the first arm 28 is maintained in fixed rotational communication with the workbench 10 through a second support joint 40 which defines a second axis of rotation 40 that is normal to the workbench surface 12. Accordingly, the first arm 28 is capable only of uniplanar rotational movement relative to the second axis of rotation of the support joint 40.

The second arm 30 is maintained in rotational communication with the tool mount 20 through a pivot 44 having an axis of rotation that is preferably vertical. However, the platform 20 is not fixed to any other element, other than an axis of rotation 47 (explained below); therefore, the platform 20 and with it, the second arm 30, are free to rotate about the hinge 32 and to rotate relative to the second axis of rotation established by the support joint 40.

It is noted that all movement of the tool support 24 and its above described associated elements will occur in a fixed, preferably horizontal plane, in that the axes of rotation of the joint 40 and the pivot 44 are both normal to the workbench 10 and, thereby, parallel to each other. As a result, all degrees of freedom of the elements of the tool support 24 are within the same, preferably horizontal, plane.

Figure 3:
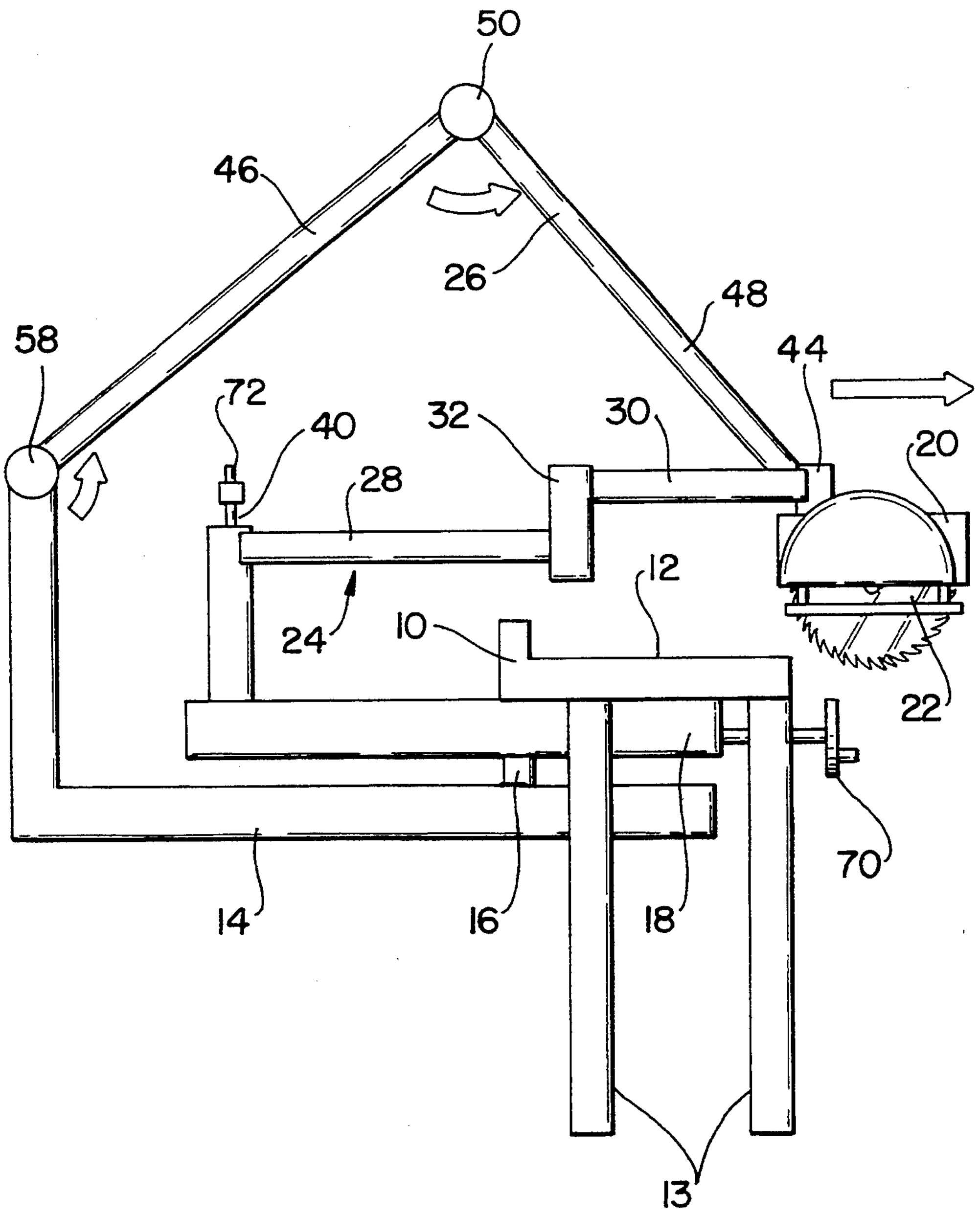
FIG. 3 is a view, similar to FIG. 2, further showing the system from the left side thereof.
Figure 4:
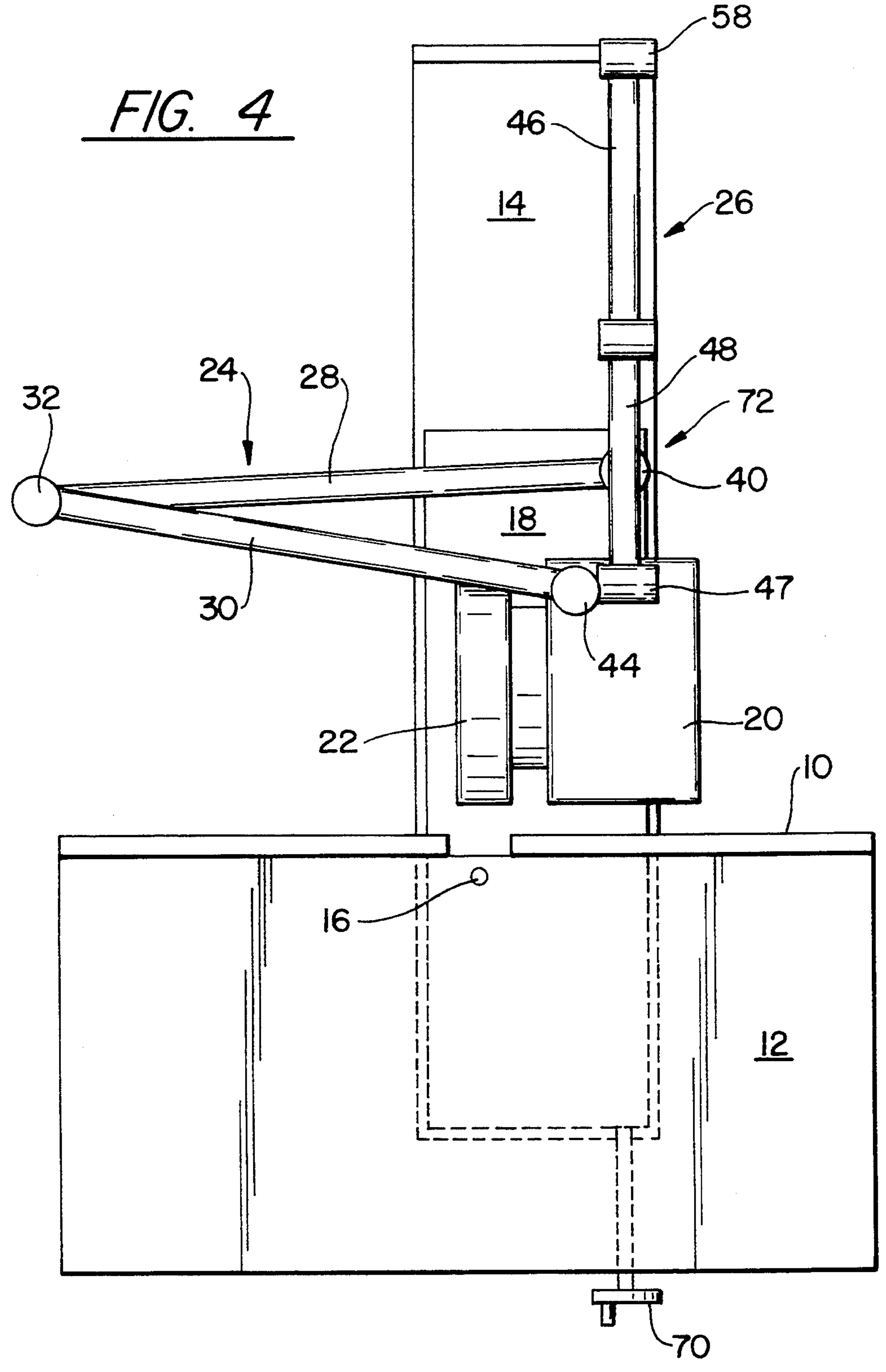
FIG. 4 is a top view of the system of FIG. 1.
Figure 5:
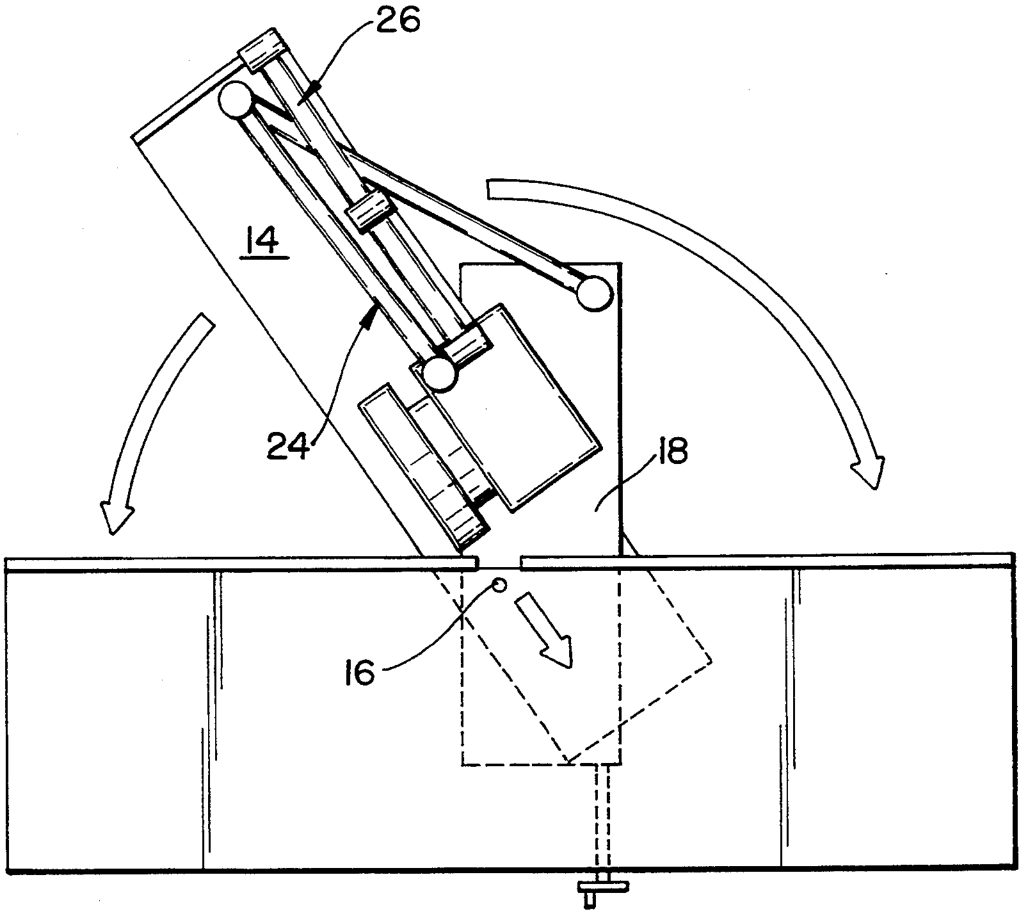
FIG. 5 is a first operational top view of FIG. 4.
Figure 6:
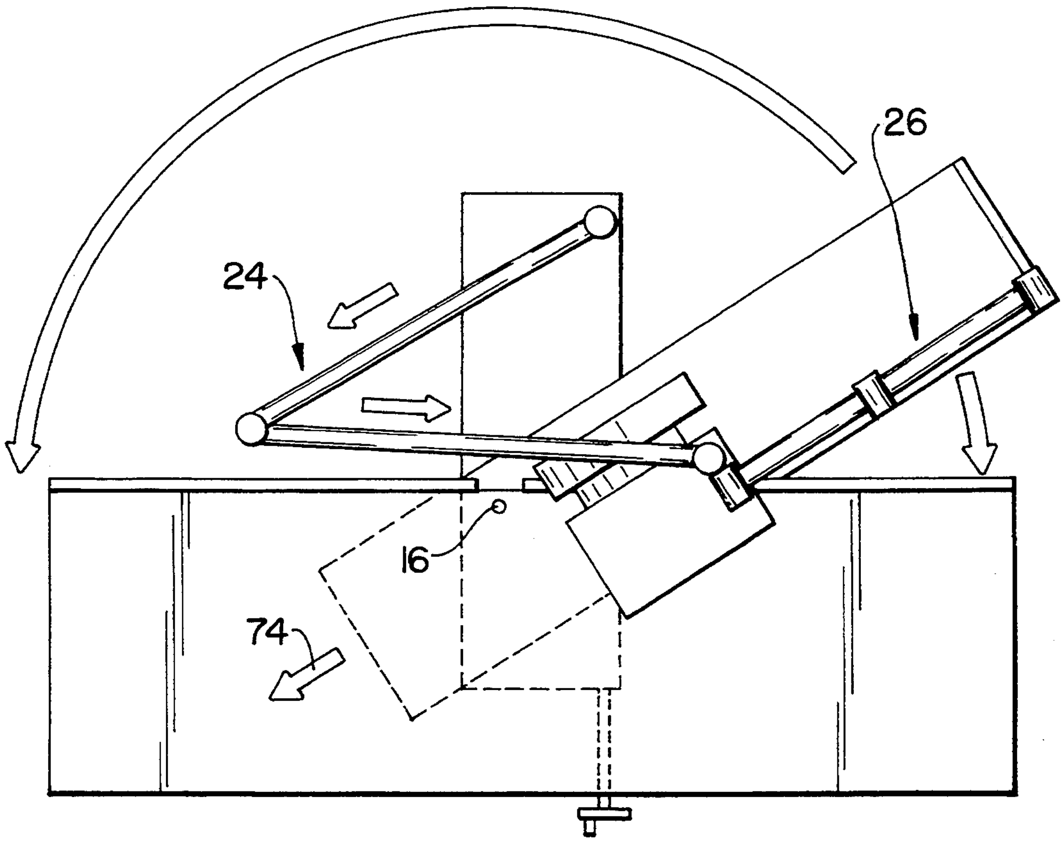
FIG. 6 is a second operational top view of FIG. 4.
Figure 7:
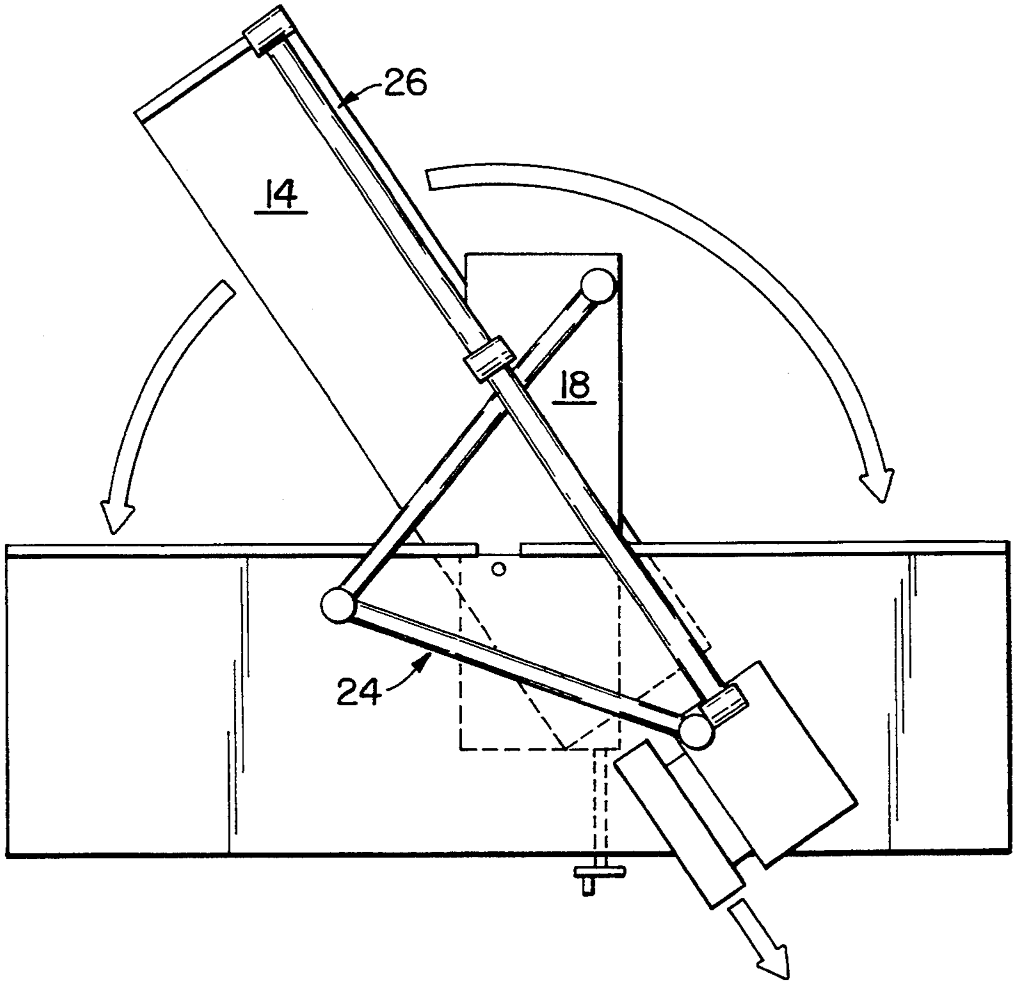
FIG. 7 is a first operational side view of FIG. 4.

With reference to FIGS. 2 and 3, the guide linkage 26 can include a first arm 46 and a second arm 48 which are joined at a hinge 50. The first arm 46 is connected through a pivot 58 to connector structure, such as the rotatable platform 14. The axis of rotation of the pivot 58 is parallel to the surface 12 of the workbench 10. Correspondingly, the second arm 48 is maintained in rotational relationship to the tool mount 20 through a horizontal axis of rotation of a pivot 47. Accordingly, in similar fashion to the tool support 24, the guide linkage 26 preferably includes two arms having opposing hinged ends thereof, and at opposite ends, each arm is coupled to other elements of the system through an axis of rotation. However, unlike the tool mount 24, the pivots 47 and 58 of the guide linkage 26 are coupled to other elements of the system through axes that are parallel, as opposed to normal, to the work surface 12. Accordingly, all elements of the guide linkage 26 will operate in a plane, preferably vertical, which is orthogonal to the above-referenced plane within which the elements of the tool mount 20 move.

The axis of rotation of the pivot 47 of the guide linkage 26 is preferably located as close as possible to the axis of rotation of the pivot 44 of the tool support 24 in order to minimize introduction of error and induction of torque into the system.

With reference to FIGS. 1–8, the workbench 10 can be provided with guide means, such as a fence 64, against which a workpiece is placed. Within the fence 64 is a slot 66 through which a blade 68 of a saw 22 can pass. The slot 66 will be preferably aligned with the first axis of rotation established by the support joint 16 so that the blade 68 passes through the slot 66, independent of the angle of cut established by the positioning of the guide linkage 26.

Further shown in FIGS. 1–4 are control means 70 and 72 by which the vertical position of the tool mount 20 can be adjusted. The control means 70 and 72 can include screw-based adjusters or other conventional adjustment mechanisms. Other control means, directly coupled to the hinge 32 and the pivot 44 or their associated arms, can also be employed.

Figure 8:
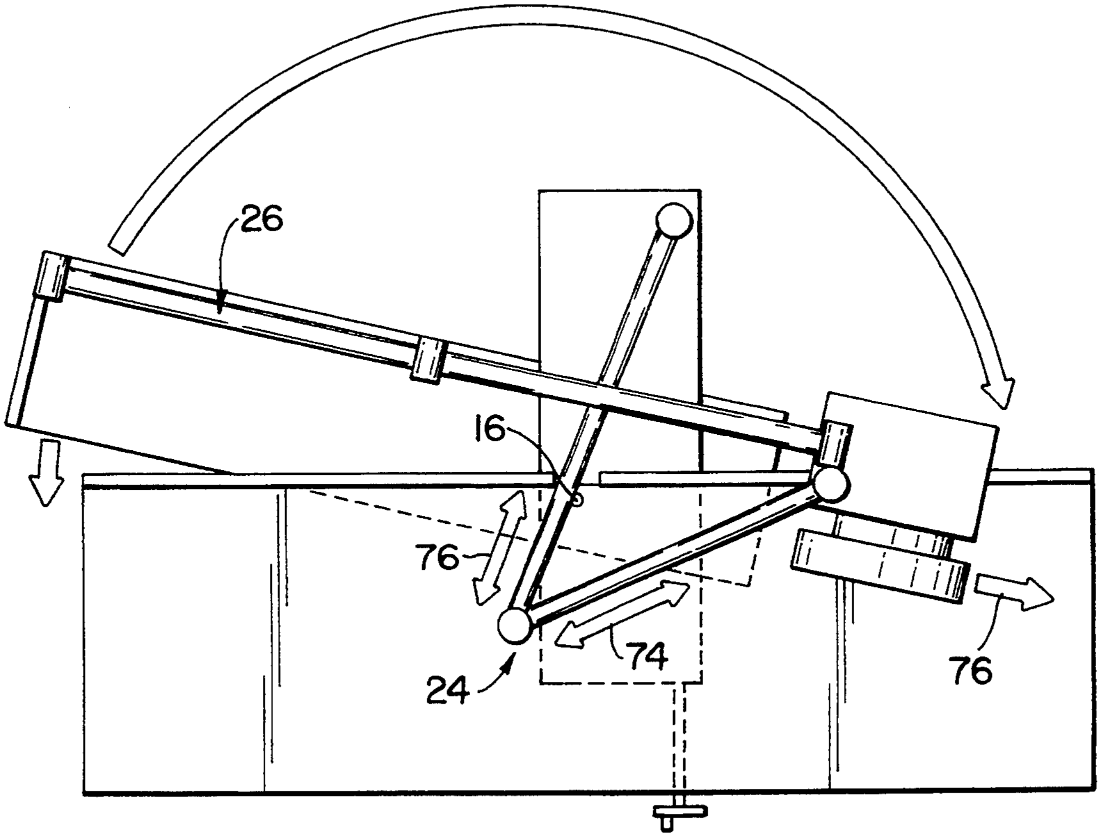
FIG. 8 is a second operational side view of FIG. 4.

With reference to FIG. 8, the path of vertical loading is indicated by arrows 74 and 76. Vertical loading is diverted from the guide linkage 26 and the rotatable platform 14, thereby solving many of the problems in the prior art devices that rely on cantilevered connector structure to not only guide and align a tool but also to bear the vertical loading of the system. Horizontal loads in the instant system are negligible.

Figure 9:
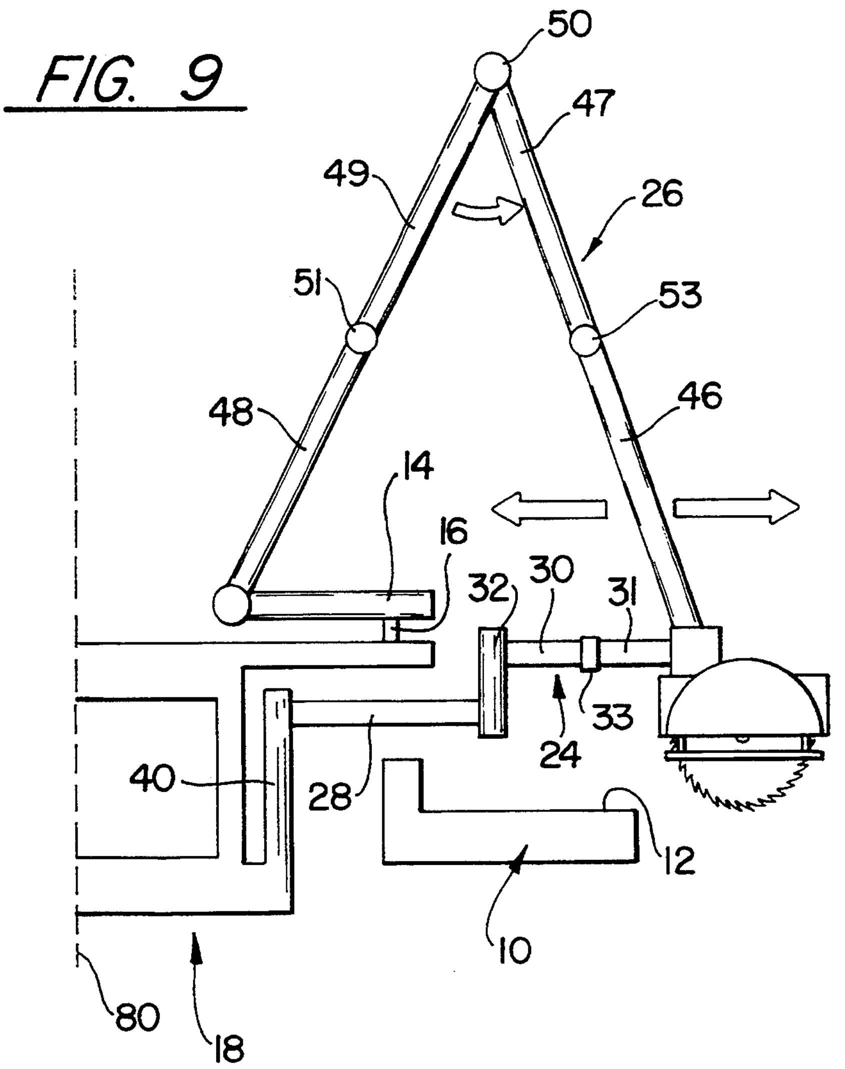
FIG. 9 is a side view of a further embodiment of the invention.

The pivotal arms 46 and 48 of the exemplary guide linkage 26 and the pivotal arms 28 and 30 of the exemplary tool support 24 constitute means for permitting the tool mount 20 to travel to and from the respective supports joints 16 and 40. This controlled motion can also be achieved by other structure. Referring to FIG. 9, the guide linkage 26 can have multiple arms, such as arms 46, 7, 48, 49, interconnected by pivotal hinges 50, 51, 53. Similarly, the tool support 24 can include multiple arms, such as arms 28, 30, 31, interconnected by pivotal hinges 32, 33.

Figure 10:
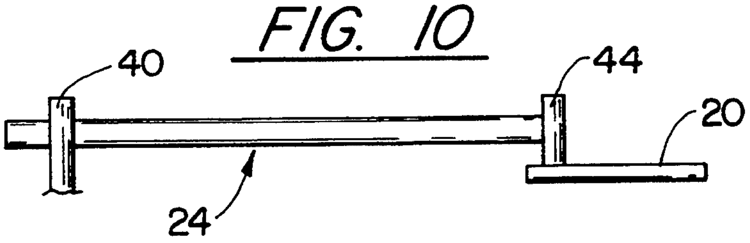
FIG. 10 is a top view of an alternative embodiment of a tool support of the invention.
Figure 11:
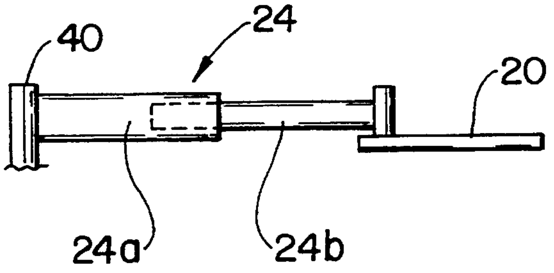
FIG. 11 is a top view of a further alternative embodiment of the tool support of the invention.

As shown in FIG. 10, the horizontally oriented tool support can include a single member 24 extending from the pivot 44 with the tool mount 20 to a sliding engagement with the support joint 40, which is operatively connected to a work surface, not shown. Alternatively, as depicted in FIG. 11, the tool support 24 can include two members 24a, 24b or more telescopically interconnected to expand and contract to move the tool mount 20 relative to the support joint 40.

The connector structure for joining the support joints to the guide linkage and the tool support have been presented as platforms. Alternatively, curved arms or other supporting members can be utilized within the scope of the invention.

Shown in FIG. 9 is a further embodiment of the invention in which connector structure, such as the rotatable platform 14, is positioned above the work surface 12. The platform 14 can be rotatably mounted through a first support joint 16 to a support frame 18. The support frame 18 can be secured to a wall 80 or otherwise alternatively operatively connected to the work surface of the workbench 10. The tool support 24 can similarly pivotally connect to the support frame 18 through a second support joint 40. According to this preferred embodiment of the invention, the guide linkage 26 is elevated above the travel plane of the tool support 24 and further reduces the opportunity for interference between these two components of the system. Further, the system can more readily be secured to surrounding structure like the wall 80, further making the workbench 10 an optional element.

Accordingly, while there has been shown and described preferred embodiments of the invention, it is to be appreciated that the invention may be embodied otherwise than is herein specifically shown and described and that, within such embodiments, certain changes may be made. For example, it should be apparent that a tool can be configured to be angled relative to the guide linkage and tool support and locked in the angled position prior to cutting to provide additional material-working alternatives. Therefore, the scope of the invention should not be limited by this description, but instead should be established by the following claims.

I claim:

1. A material-working tool control system for use with a work surface, said system comprising:

a tool mount;

a guide linkage pivotally connected to said tool mount;

a first support joint for operative connection to supporting ground and being operatively connected to said guide linkage, said first support joint providing a substantially vertical first axis of rotation for said guide linkage relative to the work surface, said guide linkage having first means for permitting vertical movement and for permitting movement of said tool mount toward and away from said first axis;

a tool support pivotally connected to said tool mount; and a second support joint for operative connection to supporting ground and being operatively connected to said tool support, said tool support extending substantially horizontally from said tool mount to said second support joint, said tool support being pivotable relative to said second support joint about a substantially vertical second axis of rotation, said tool support having second means for permitting movement of said tool mount horizontally toward and away from said second axis of rotation, said second support joint being separated from and supported separately from said first support joint such that said second support joint is not supported by said first support joint, and said first support, joint does not bear the weight of the second support joint, said tool support and said tool mount.

2. The system according to claim 1, wherein said first means for permitting movement of said tool mount toward and away from said first axis moves substantially only in a vertical plane.

3. The system according to claim 2, wherein said second means for permitting movement of said tool mount horizontally toward and away from said second axis moves substantially only in a horizontal plane.

4. The system according to claim 2, wherein said first means for permitting movement of said tool mount toward and away from said first axis includes at least two coplanar arms hinged to pivot relative to each other within said vertical plane.

5. The system according to claim 1, wherein said second means for permitting movement of said tool mount horizontally toward and away from said second axis moves substantially only in a horizontal plane.

6. The system according to claim 5, wherein said second means for permitting movement of said tool mount horizontally toward and away from said second axis includes at least two coplanar arms hinged to pivot relative to each other within said horizontal plane.

7. The system according to claim 5, wherein said second means for permitting movement of said tool mount horizontally toward and away from said second axis includes a cantilever member extending from said tool mount to said second support joint, said cantilever member being horizontally slidable relative to said second support joint.

8. The system according to claim 5, wherein said second means for permitting movement of said tool mount horizontally toward and away from said second axis includes at least two members telescopically connected to expand and contract relative to each other.

9. The system according to claim 1, further comprising a tool connected to said tool mount.

10. The system according to claim 9, wherein said tool is a saw.

11. The system according to claim 1, wherein said tool mount is a platform.

12. The system according to claim 1, further comprising a support frame for mounting to a vertical wall, said frame separately supporting said first and second support joints, wherein said second support joint is not supported by said first support joint, whereby said first support joint does not bear the weight of said second support joint, said tool support, and said tool mount.

13. A tool system, comprising:

a work surface;

a tool mount;

a guide linkage pivotally connected to said tool mount about an axis parallel to said work surface;

a first support joint operatively connected to supporting ground and being operatively connected to said guide linkage, said first support joint providing a first axis normal to said work surface for rotation of said guide linkage relative to said work surface, said guide linkage having first means for permitting vertical movement and for permitting movement of said tool mount toward and away from said first axis;

a tool support pivotally connected to said tool mount about an axis normal to said work surface; and a second support joint operatively connected to supporting ground and being operatively connected to said tool support, said tool support extending substantially parallel to said work surface from said tool mount to said second support joint, said tool support being pivotable relative to said second support joint about a second axis of rotation substantially normal to said work surface, said tool support having second means for permitting movement of said tool mount horizontally toward and away from said second axis substantially parallel to said work surface, said second support joint being separated from and supported separately from said first support joint such that said second support joint is not supported by said first support joint, and said first support, joint does not bear the weight of said second support joint, said tool support and said tool mount.

14. The tool system according to claim 13, wherein said first support joint is disposed below said work surface.

15. The tool system according to claim 13, wherein said first support joint is disposed above said work surface.

16. The tool system according to claim 15, further comprising a support frame having a top surface suspended above the work surface, said support frame extending from said top surface to a mounting surface disposed below said work surface, said first support joint being mounted on said top surface.

17. The tool system according to claim 15, wherein said first support joint is substantially disposed above the travel plane of said tool mount.

18. The tool system according to claim 13, wherein said work surface includes a fence for engaging and aligning a workpiece, said fence having a slot for passage of a tool, said first axis of rotation passing through said passage.

19. The system according to claim 13, further comprising a tool connected to said tool mount.

20. The system according to claim 19, wherein said tool is a saw.

21. The system according to claim 13, further comprising means for adjusting the vertical position of said tool support relative to said work surface.

* * * * *